United States Patent
Yang et al.

(10) Patent No.: US 9,540,179 B2
(45) Date of Patent: Jan. 10, 2017

(54) MOBILE ROBOT FOR CABLE

(71) Applicant: INDUSTRY-ACADEMIC COOPERATION FOUNDATION YONSEI UNIVERSITY, Seoul (KR)

(72) Inventors: Hyun Seok Yang, Seoul (KR); E Noch Oh, Seoul (KR)

(73) Assignee: INDUSTRY-ACADEMIC COOPERATION FOUNDATION YONSEI UNIVERSITY, Seoul (KR)

( * ) Notice: Subject to any disclaimer, the term of this patent is extended or adjusted under 35 U.S.C. 154(b) by 94 days.

(21) Appl. No.: 14/455,621

(22) Filed: Aug. 8, 2014

(65) Prior Publication Data

US 2015/0044009 A1    Feb. 12, 2015

(30) Foreign Application Priority Data

Aug. 9, 2013    (KR) .......................... 10-2013-0094654

(51) Int. Cl.
  H01L 21/677    (2006.01)
  B65G 25/04    (2006.01)
  H02G 1/04    (2006.01)

(52) U.S. Cl.
  CPC ............... B65G 25/04 (2013.01); H02G 1/04 (2013.01)

(58) Field of Classification Search
  CPC .................................. B65G 25/04; H02G 1/04
  USPC ......................................................... 414/787
  See application file for complete search history.

(56) References Cited

U.S. PATENT DOCUMENTS

| | | | | |
|---|---|---|---|---|
| 2,948,483 | A * | 8/1960 | Petersen | B65H 49/24 242/155 BW |
| 3,073,574 | A * | 1/1963 | Garnett | H02G 1/04 242/481.4 |
| 3,703,980 | A * | 11/1972 | Bright | H01R 4/66 226/195 |
| 5,103,739 | A * | 4/1992 | Sawada | H02G 1/02 104/112 |
| 2011/0040427 | A1* | 2/2011 | Ben-Tzvi | B25J 5/005 701/2 |
| 2015/0153170 | A1* | 6/2015 | Gonzalez | G01B 21/22 701/300 |

(Continued)

FOREIGN PATENT DOCUMENTS

| | | |
|---|---|---|
| JP | 10-118964 A | 5/1998 |
| JP | 10-248130 A | 9/1998 |

(Continued)

Primary Examiner — Charles A Fox
Assistant Examiner — James Buckle, Jr.
(74) Attorney, Agent, or Firm — LRK Patent Law Firm

(57) ABSTRACT

A mobile robot for a cable includes a first gripper unit including a first main body, a first driving wheel unit disposed over the first main body and configured to have its wheels changed up and down, and a first support wheel unit disposed under the first main body; a second gripper unit including a second main body, a second driving wheel unit disposed over the second main body and configured to have its wheels changed up and down, and a second support wheel unit disposed under the second main body; and a link unit including first links fixed to the first gripper unit, second links fixed to the second gripper unit, and a link driving unit configured to control the angle of the first links and the second links that are fixed together by a main hinge unit so that they rotate at an angle.

9 Claims, 20 Drawing Sheets

(56) References Cited

U.S. PATENT DOCUMENTS

2015/0204480 A1* 7/2015 Lorimer ............... H02G 1/02
                                                                                          700/245

FOREIGN PATENT DOCUMENTS

| JP | 2006-254567 A | 9/2006 |
|---|---|---|
| JP | 2012-115064 A | 6/2012 |
| KR | 10-1992-0007876 A | 5/1992 |
| KR | 10-0846744 B1 | 7/2008 |
| KR | 10-2012-0035859 A | 4/2012 |

* cited by examiner

MOBILE ROBOT FOR CABLE

CROSS REFERENCE TO RELATED APPLICATION

The present application claims the benefit of Korean Patent Application No. 10-2013-0094654 filed in the Korean Intellectual Property Office on Aug. 9, 2013, the entire contents of which are incorporated herein by reference.

BACKGROUND OF THE INVENTION

1. Technical Field

The present invention relates to a mobile robot for a cable and, more particularly, to a mobile robot for a cable, which has a specific structure that enables the mobile robot to overcome obstacles installed in a cable and to move on the cable.

2. Description of the Related Art

Cables installed at high places are used in modern buildings or structures, such as skyscrapers, grand bridges, and steel towers for transmission lines. For example, cables may be used in structures installed outside skyscrapers, suspension bridges, and transmission lines installed by steel towers for transmission lines.

Furthermore, the state of such cables used in buildings or structures need to be tested and repaired for safety test or maintenance and repair purposes after the cables are constructed.

In a conventional task for testing or repairing the state of such a cable, a worker must directly reach the cable and perform the task. Such a method, however, is attended with danger because the safety of the worker is not guaranteed. Furthermore, in order to perform a task for testing a transmission line, many social costs are generated because power of a transmission line must be blocked in order to guarantee the safety of workers.

In order to solve the problems, a method of checking, by a worker on the ground, cables, transmission lines, and parts installed in the cables using a high magnification telescope is used. If cables, transmission lines, and parts installed in the cables are checked using a high magnification telescope, there is a problem in that a correct check is not performed because the opposite side is unable to be seen.

Other methods used to solve such problems may include a method of checking, by a worker who gets on a helicopter, cables, transmission lines, and parts installed in the cables using a high magnification telescope and a method of using an unmanned control helicopter on which a high magnification telescope is mounted. However, those methods are problematic in that they have low work efficiency.

In order to solve such problems, a mobile robot capable of moving on a cable has recently been developed and used.

A conventional mobile robot for a cable can move on a cable and check the state of the cable because it is equipped with a gripper apparatus having a specific structure and a plurality of drivers and a plurality of posture controllers.

The conventional mobile robot for a cable, however, has problems in that the mobile robot is very complicated to implement a moving mechanism because it includes the plurality of drivers and the plurality of posture controllers and the mobile robot has low mobility because it has heavy weight.

Furthermore, the conventional mobile robot for a cable is problematic in that it does not overcome a cable in which various types of obstacles are installed and does not move on the cable.

PRIOR ART DOCUMENT

Patent Document (Patent Document 0001) Korean Patent Application Publication No. 10-1992-0007876 (May 27, 1992)

SUMMARY OF THE INVENTION

Accordingly, the present invention has been made keeping in mind the above problems occurring in the prior art, and an object of the present invention is to provide a mobile robot for a cable, which is configured to have improved mobility even in a cable in which various types of obstacles are installed and to have light weight and is driven according to a simple moving mechanism.

In accordance with an aspect of the present invention, there is provided a mobile robot for a cable, including a first gripper unit configured to include a first main body, a first driving wheel unit disposed over the first main body and configured to have its wheels changed up and down, and a first support wheel unit disposed under the first main body; a second gripper unit configured to include a second main body, a second driving wheel unit disposed over the second main body and configured to have its wheels changed up and down, and a second support wheel unit disposed under the second main body; and a link unit configured to include first links fixed to the first gripper unit, second links fixed to the second gripper unit, and a link driving unit configured to control an angle of the first links and the second links, wherein the first links and the second links are fixed together by a main hinge unit in such a way as to rotate at a specific angle. The first driving wheel unit, together with the first support wheel unit, may closely attach the first gripper unit to the cable or separate the first gripper unit from the cable by gripping or releasing the cable through up and down movements. The second driving wheel unit, together with the second support wheel unit, may closely attach the second gripper unit to the cable or separate the second gripper unit from the cable by gripping or releasing the cable through up and down movements.

Furthermore, the first driving wheel unit and the second driving wheel unit may include driving wheels configured to closely adhere to the top of the cable and rotate around the cable; respective driving motors configured to transfer driving force to the driving wheels; and respective location change units configured to include respective screws, respective screw motors, respective guide plates, guide rollers, and respective driving wheel supports so that up and down locations of the driving wheels are able to be controlled. The driving wheel may be mounted on one end of the driving wheel support, the other end of the driving wheel support is united with the screw, and a guide roller that is restricted along the guide plate and moved is mounted between the first end and second end of the driving wheel support. When the screw motor is driven, the screw may be rotated, and the location and angle of the driving wheel support may be changed by the rotation of the screw.

In such a case, a friction member made of elastic materials may be mounted on the outer circumference surface of the driving wheel so that the friction member is firmly adhered to the top of the cable and provides specific friction force.

Furthermore, the first support wheel unit and the second support wheel unit may include respective pairs of support wheels configured to closely adhere to a bottom of the cable and to be capable of rotating and respective support frames mounted on one sides of the respective pairs of support wheels in such a way as to rotate.

In such a case, locations on the sides of the pairs of support wheels may be locations capable of forming equilateral triangle or isosceles triangle structures along with the locations of the driving wheels.

Furthermore, support wheel guides each having a circular shape on a side may be mounted on both sides of each of the support wheels so that the support wheel guides are closely adhered to the bottom and part of sides of the cable, wherein each of the support wheel guides has an external diameter D2 that is to 150% of an external diameter D1 of the support wheel.

Furthermore, the first support wheel unit and the second support wheel unit may include respective auxiliary arms mounted on one ends of the respective support frames and extended in a specific length in the direction along which the mobile robot travels and respective auxiliary wheels mounted on one ends of the respective auxiliary arms in such a way as to rotate and configured to closely adhere to the bottom of the cable and rotate on the cable.

Furthermore, the link driving unit may include a screw mounted on the second links and rotated by a link driving motor; a slider mounted on the screw and linearly moved by the rotation of the screw; and rods configured to have one ends fixed to the first links by first rod hinges in such a way as to rotate and to have the other ends fixed to the slider by second rod hinges in such a way as to rotate.

Furthermore, an external mounting member may be further mounted on the first main body or the second main body.

In such a case, the external mounting member may include one or more selected from the group consisting of camera equipment, cable repair equipment, arms equipment, disaster relief equipment, weather observation equipment, heat detection equipment, cleaning equipment, and welding equipment.

Furthermore, the present invention provides method of overcoming, by the mobile robot for a cable, an obstacle and moving on a cable. In accordance with an aspect of the present invention, the method may include (a) recognizing the obstacle; (b) releasing a gripping state of the first gripper unit by moving the first driving wheel unit to an upper location; (c) changing an angle of the first link and the second link by driving the link driving unit so that the first gripper unit is placed under the cable; (d) driving the second driving wheel unit of the second gripper unit so that the second driving wheel unit moves closely toward the obstacle; (e) changing the angle of the first link and the second link by driving the link driving unit so that the first gripper unit is placed in the cable; (f) placing the first driving wheel unit to a lower location so that the first gripper unit grips the cable; (g) moving the second driving wheel unit of the second gripper unit to an upper location so that the gripping state of the second gripper unit is released; (h) changing the angle of the first link and the second link by driving the link driving unit so that the second gripper unit is placed under the cable; (i) moving the mobile robot by driving the first driving wheel unit of the first gripper unit so that the second gripper unit is moved to a side opposite the obstacle; (j) changing the angle of the first link and the second link by driving the link driving unit so that the second gripper unit is placed in the cable; and (k) moving the second driving wheel unit to a low location so that the second gripper unit grips the cable.

In such a case, the obstacle may include a spacer, a jumper, or a tensile clamp fixed to the cable.

Figure 1:
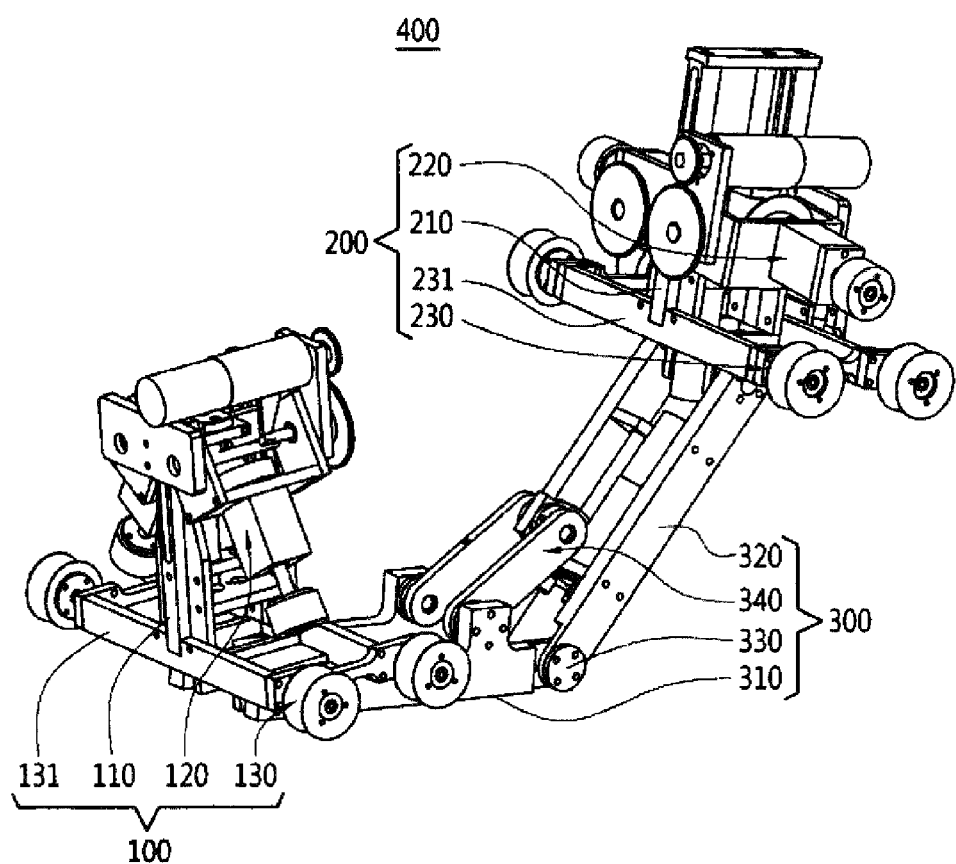
FIG. 1 is a perspective view of a mobile robot for a cable in accordance with an embodiment of the present invention.

| <Description of reference numerals of principal elements in the drawings> | |
|---|---|
| 10: cable | 11: obstacle |
| 100: first gripper unit | 110: first main body |
| 120: first driving wheel unit | 120': first driving wheel unit |
| 120'': first driving wheel unit | |
| 121: location change unit | 121': location change unit |
| 121'': location change unit | |
| 1211: screw | 1211': screw |
| 1212: screw motor | 1213: guide plate |
| 1213': guide plate | 1214: guide roller |
| 1214': guide roller | 1215: driving wheel support |
| 1215': driving wheel support | 1216: slider |
| 1216': slider | 122: driving wheel |
| 1221: friction member | 123: driving motor |
| 130: first support wheel unit | 131: support frame |
| 132: support wheel | 1321: support wheel guide |
| 133: auxiliary arm | 134: auxiliary wheel |
| 1341: friction member | 200: second gripper unit |
| 210: second main body | |
| 220: second driving wheel unit | |
| 221: location change unit | 2211: screw |
| 2211': screw | 2212: screw motor |
| 2213: guide plate | 2213': guide plate |
| 2214: guide roller | 2215: driving wheel support |
| 2215': driving wheel support | 2216: slider |
| 2216': slider | 222: driving wheel |

-continued

<Description of reference numerals of principal elements in the drawings>

| | |
|---|---|
| 2221: friction member | 223: driving motor |
| 230: second support wheel unit | |
| 31: support frame | |
| 232: support wheel | 2321: support wheel guide |
| 233: auxiliary arm | 234: auxiliary wheel |
| 2341: friction member | 300: link unit |
| 310: first link | 311: first link fixing unit |
| 320: second link | 321: second link fixing unit |
| 330: main hinge unit | 340: link driving unit |
| 341: rods | 3411: first rod hinge |
| 3412: second rod hinge | 342: slider |
| 343: screw | 3431: screw gear |
| 344: link driving motor | 3441: driving motor gear |
| 400, 400A: mobile robot for cable | |
| 500, 500': external mounting member | |

DETAILED DESCRIPTION

Hereinafter, some exemplary embodiments of the present invention are described in detail with reference to the accompanying drawings, but the category of the present invention is not limited to the embodiments. In describing the embodiments of the present invention, a detailed description of the known functions and constitutions will be omitted if it is deemed to make the gist of the present invention unnecessarily vague.

FIG. 1 is a perspective view of a mobile robot for a cable in accordance with an embodiment of the present invention.

Referring to FIG. 1, the mobile robot 400 for a cable according to the present embodiment is configured to include a first gripper unit 100, a second gripper unit 200, and a link unit 300.

More specifically, the first gripper unit 100 may be configured to include a first main body 110, a first driving wheel unit 120 disposed over the first main body 110 and configured to have its wheels changed up and down, and a first support wheel unit 130 disposed under the first main body 110.

Furthermore, the second gripper unit 200 may be configured to include a second main body 210, a second driving wheel unit 220 disposed over the second main body 210 and configured to have its wheels changed up and down, and a second support wheel unit 230 disposed under the second main body 210.

The link unit 300 may be configured to include first links 310 fixed to the first gripper unit 100 and second links 320 fixed to the second gripper unit 200. Furthermore, the first links 310 and the second links 320 may be fixed together by a main hinge unit 330 in such a way as to rotate at a specific angle. The link unit 300 may be configured to further include a link driving unit 340 configured to control the angle of the first links 310 and the second links 320.

Figure 2:
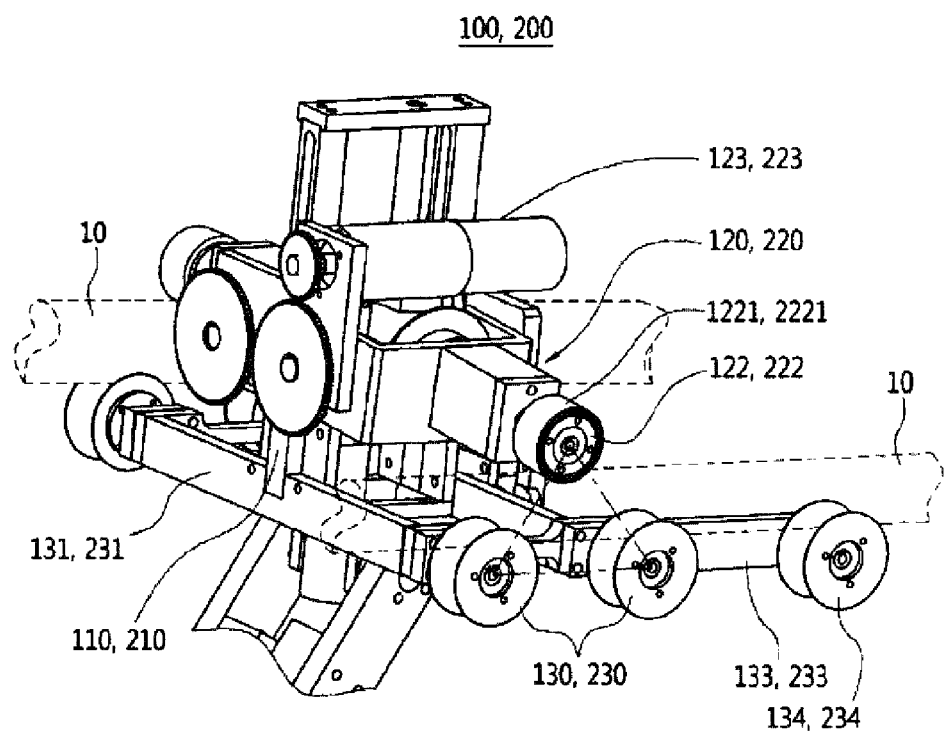
FIG. 2 is a perspective view of a first gripper unit and a second gripper unit illustrated in FIG. 1.
Figure 3:
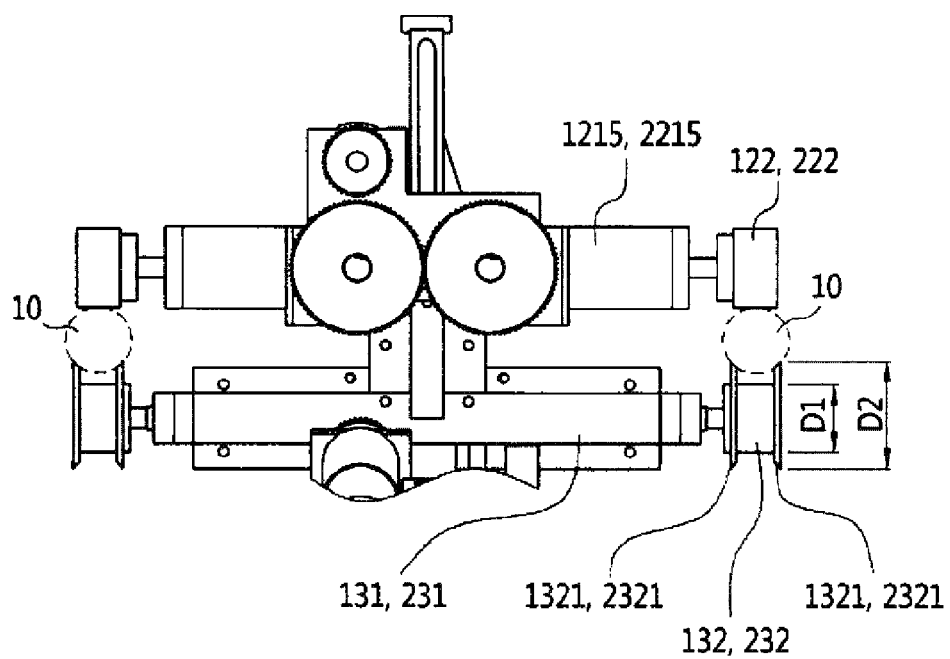
FIG. 3 is a front view of driving wheels and support wheels illustrated in FIG. 1.

FIG. 2 is a perspective view of the first gripper unit 100 and the second gripper unit 200 illustrated in FIG. 1, and FIG. 3 is a front view of driving wheels and support wheels illustrated in FIG. 1.

Referring to FIGS. 2 and 3 along with FIG. 1, the gripper unit 100, 200 may be configured to include the driving wheel unit 120, 220 and the support wheel unit 130, 230.

More specifically, the driving wheel unit 120, 220 may be equipped with a driving wheel 122, 222 configured to closely adhere to the top of a cable (not illustrated) and rotate around the cable. Furthermore, friction member 1221, 2221 made of elastic materials may be mounted on the outer circumference surface of the driving wheel 122, 222 so that it is firmly adhered to the top of a cable (not illustrated) and can provide specific friction force. The friction member 1221, 2221 is not specially limited to any materials if it may firmly adhere to the top of the cable and may provide specific friction force. For example, the friction member 1221, 2221 may be a rubber pad or a tire made of rubber materials.

Furthermore, the first and the second support wheel units 130, 230 may be configured to include respective pairs of support wheels 132 and 232 configured to closely adhere to the bottom of the cable and to be capable of rotating and respective support frames 131, 231 mounted on one sides of the respective pairs of support wheels 132, 232 in such a way as to rotate.

Locations on the sides of the pairs of support wheels 132, 232 may be locations capable of forming equilateral triangle or isosceles triangle structures along with the locations of the driving wheels 122, 222, as illustrated in FIG. 2.

As illustrated in FIG. 3, support wheel guides 1321, 2321 each having a circular shape on the side may be mounted on both sides of each of the support wheels 132, 232 so that they are closely adhered to the bottom and part of sides of the cable. In this case, each of the support wheel guides 1321, 2321 has an external diameter D2 that is 110 to 150% of an external diameter D1 of the support wheel 132, 232.

As illustrated in FIG. 2, the first and the second support wheel unit 130, 230 may further include an auxiliary arm 133, 233 mounted on one end of the support frame 131, 231 and extended in a specific length in the direction along which the mobile robot for a cable travels. Furthermore, an auxiliary wheel 134, 234 may be mounted on one end of the auxiliary arm 133, 233 in such a way as to rotate, and may be closely adhered to the bottom of the cable and rotated on the cable. The auxiliary wheel 134, 234 mounted as described above enables the mobile robot 400 for a cable to be closely adhered to the cable more stably.

Figure 4:
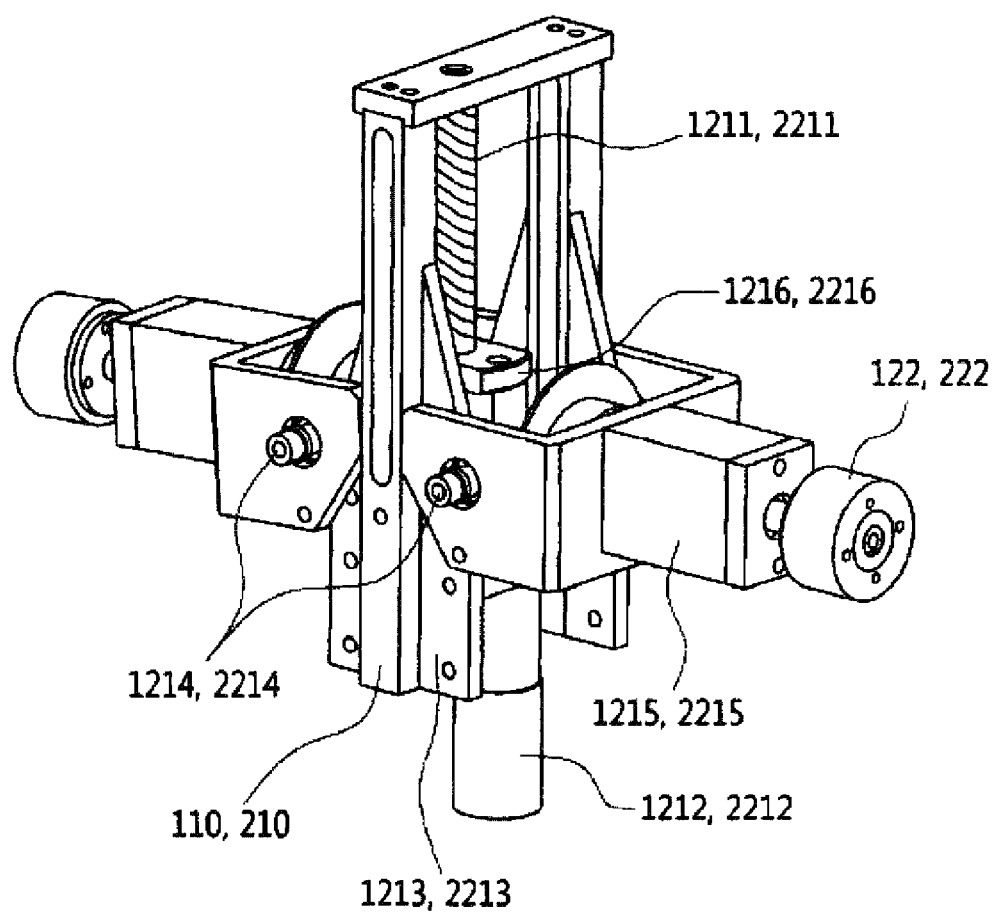
FIG. 4 is a perspective view of a location change unit illustrated in FIG. 1.
Figure 5:
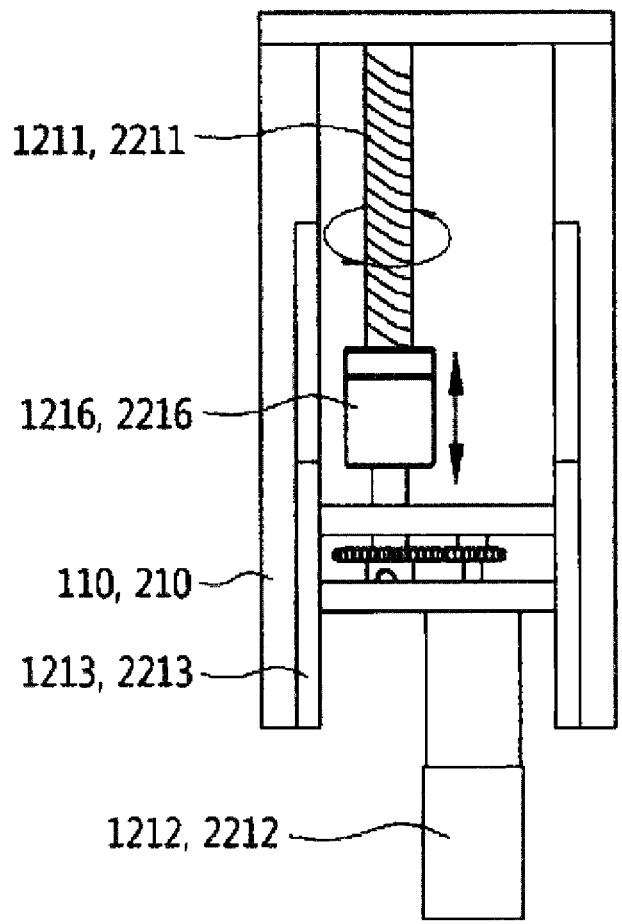
FIG. 5 is a front view illustrating a driving force transfer relationship between a screw and a screw motor illustrated in FIG. 4.
Figure 6:
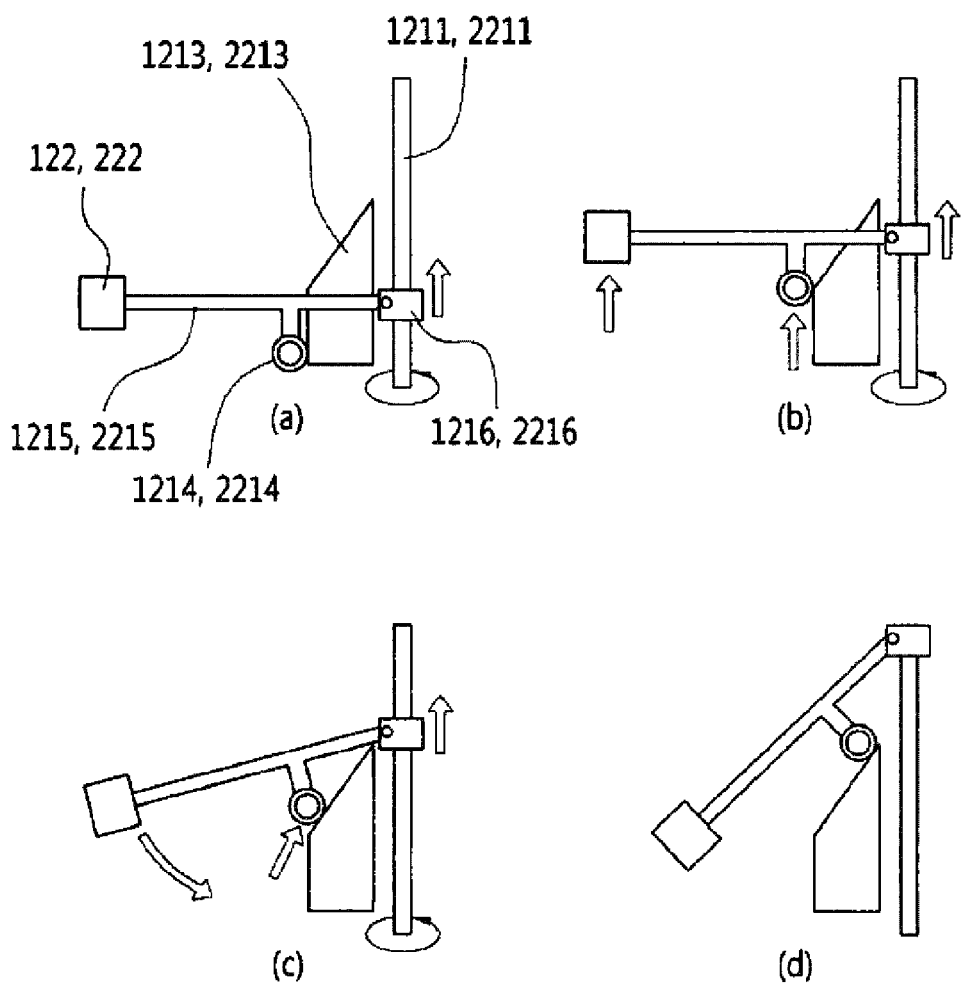
FIG. 6 is a diagram illustrating an example in which the location change unit illustrated in FIG. 1 is driven.

FIG. 4 is a perspective view of a location change unit illustrated in FIG. 1, and FIG. 5 is a front view illustrating a driving force transfer relationship between a screw and a screw motor illustrated in FIG. 4. Furthermore, FIG. 6 is a diagram illustrating an example in which the location change unit illustrated in FIG. 1 is driven, and FIG. 7 is a diagram illustrating an example in which the location of the driving wheel illustrated in FIG. 1 is changed by the location change unit.

Referring to FIGS. 4 to 7 along with FIG. 1, the location change unit 121, 221 according to the present embodiment may be configured to include a screw 1211, 2211, a screw motor 1212, 2212, a guide plate 1213, 2213, guide rollers 1214, 2214, and a driving wheel support 1215, 2215 so that the location of the driving wheel 122, 222 may be controlled up and down.

More specifically, the driving wheel 122, 222 may be mounted on one end of the driving wheel support 1215, 2215. The other end of the driving wheel support 1215, 2215 may be united with the screw 1211, 2211. The guide roller 1214, 2214 that is restricted along the guide plate 1213, 2213 and moved may be mounted between one end and the other end of the driving wheel support 1215, 2215. Accordingly, as illustrated in FIG. 6, when the screw motor 1212, 2212 is driven, the screw 1211, 2211 is rotated, and thus the location and angle of the driving wheel support 1215, 2215 may be changed by the rotation of the screw 1211, 2211.

Figure 7:
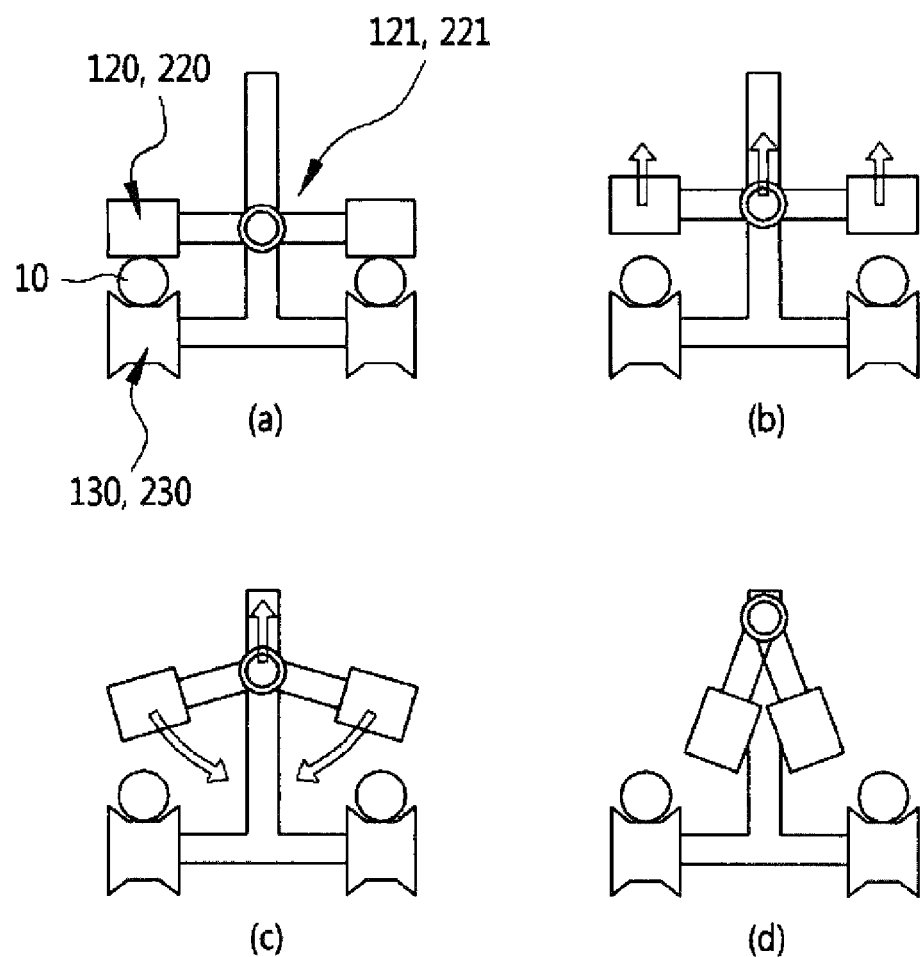
FIG. 7 is a diagram illustrating an example in which the location of the driving wheel illustrated in FIG. 1 is changed by the location change unit.

As a result, as illustrated in FIG. 7, the first driving wheel unit 120, together with the first support wheel unit 130, grips or releases the cable 10 when the location of the first driving wheel unit 120 is changed up and down, thereby being capable of closely adhering the first gripper unit 100 to the cable 10 or releasing the first gripper unit 100 from the cable 10. Furthermore, the second driving wheel unit 220, together with the second support wheel unit 230, grips or releases the cable 10 when the location of the second driving wheel unit 220 is changed up and down, thereby being capable of closely adhering the second gripper unit 200 to the cable 10 or releasing the second gripper unit 200 from the cable 10.

Figure 8:
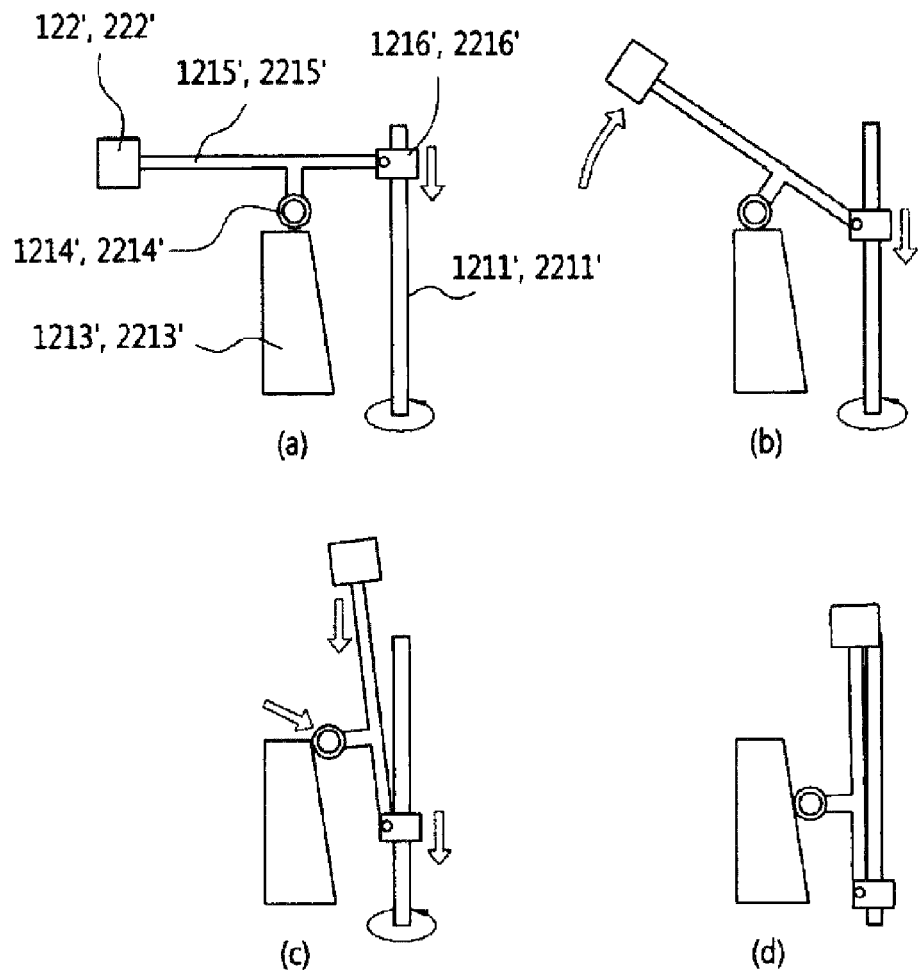
FIGS. 8 to 10 are diagrams illustrating examples in which the location change unit is driven and the location of the driving wheel is changed by the location change unit in accordance with another embodiment of the present invention.
Figure 9:
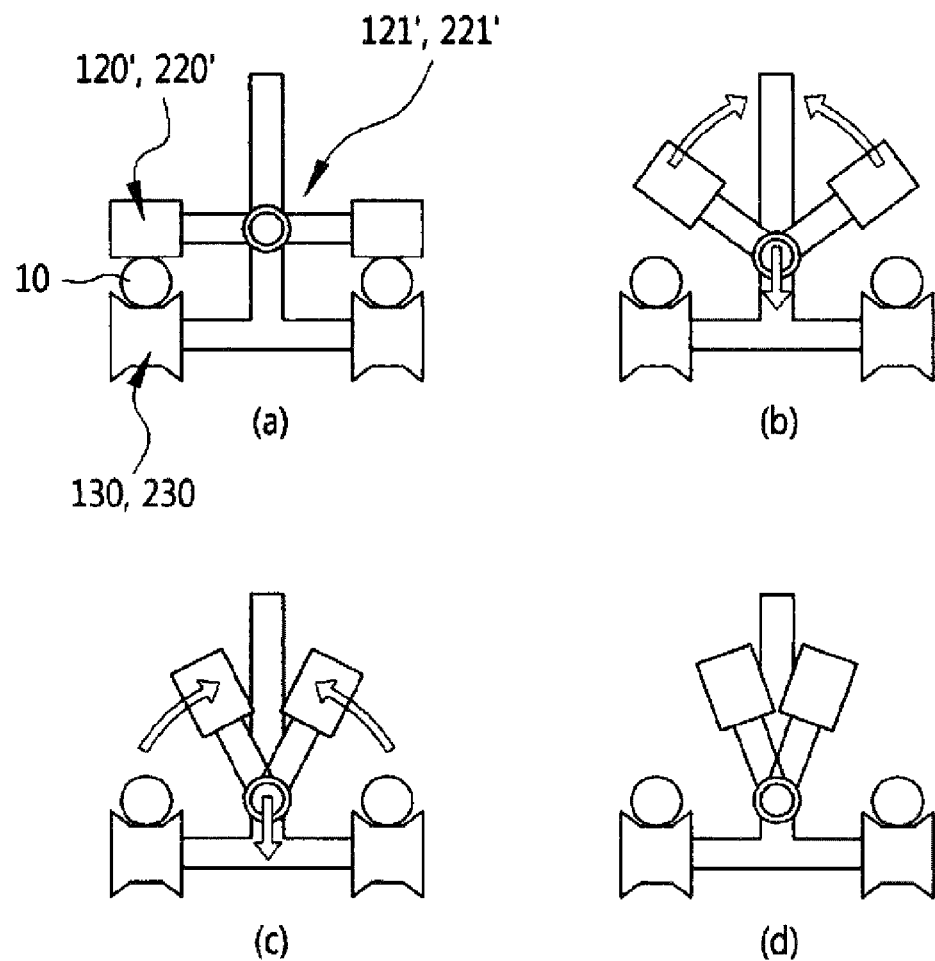
Figure 10:
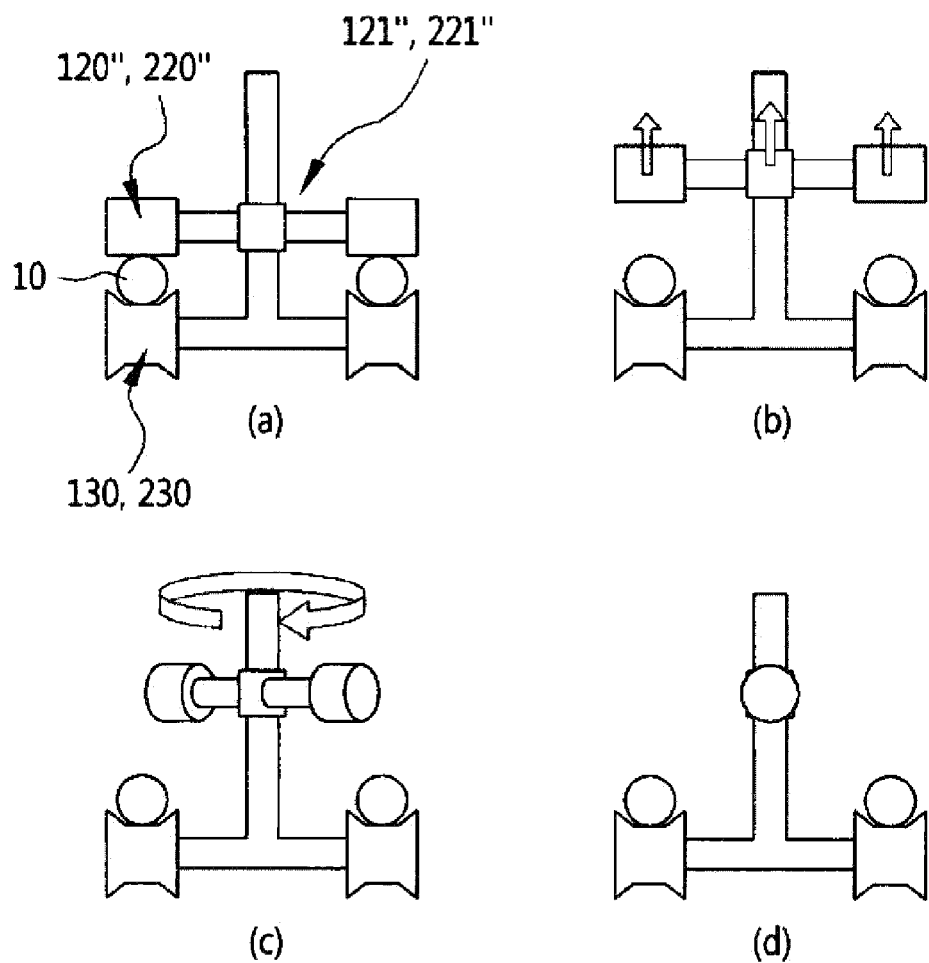

FIGS. 8 to 10 are diagrams illustrating examples in which the location change unit is driven and the location of the driving wheel is changed by the location change unit in accordance with another embodiment of the present invention.

Referring to FIGS. 8 and 9, a location change unit 121', 221' according to the present embodiment may be configured to include a screw 1211', 2211', a screw motor (not illustrated), a guide plate 1213', 2213', a guide roller 1214', 2214', and a driving wheel support 1215', 2215' so that the location of the driving wheel 122', 222' is controlled up and down.

More specifically, the driving wheel 122', 222' may be mounted on one end of the driving wheel support 1215', 2215'. The other end of the driving wheel support 1215', 2215' may be united with the screw 1211', 2211'. The guide roller 1214', 2214' that is restricted along the guide plate 1213', 2213' and configured to be movable may be mounted between one end and the other end of the driving wheel support 1215', 2215'. Accordingly, as illustrated in FIG. 8, the location and angle of the driving wheel support 1215', 2215' may be changed by the rotation of the screw 1211', 2211'.

Referring to FIG. 10, a location change unit 121", 221" according to the present embodiment may move the location of a driving wheel unit 120", 220" by upward moving the driving wheel unit 120", 220" ((b) of FIG. 10) and then rotating the driving wheel unit 120", 220" at an angle of 90 degrees ((c) and (d) of FIG. 10).

Figure 11:
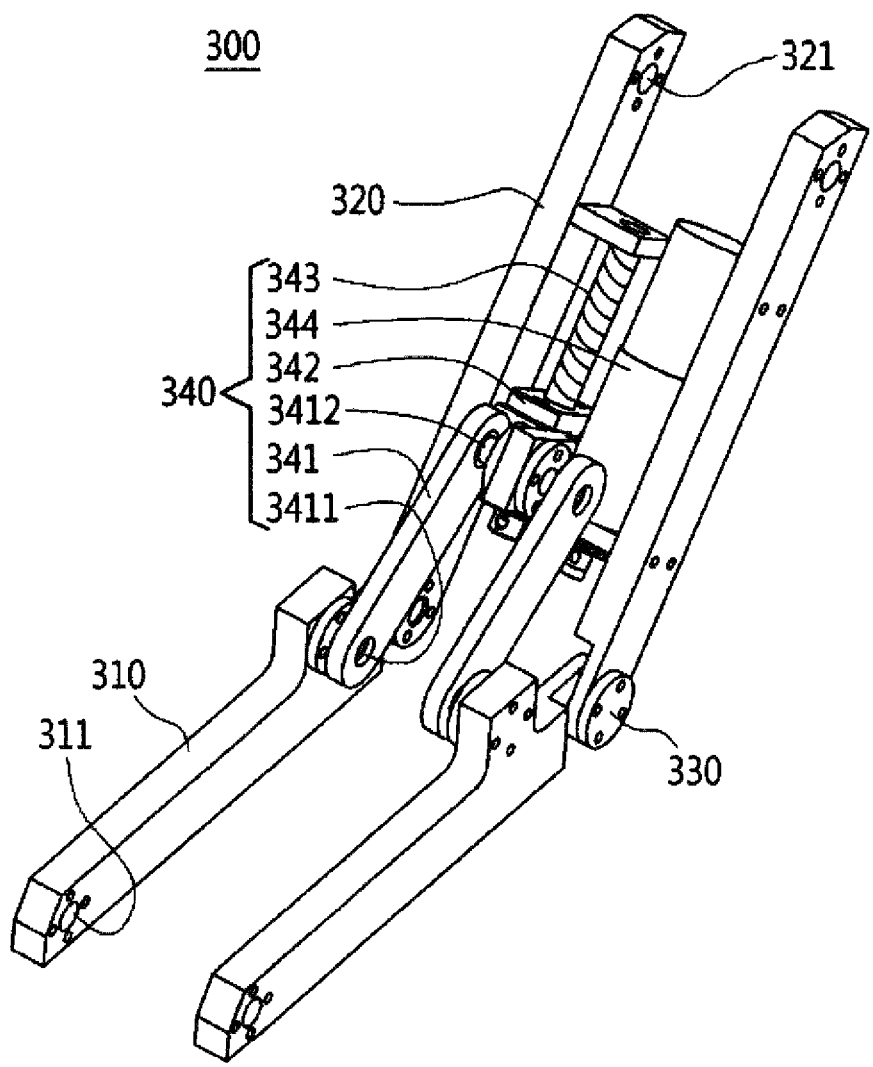
FIG. 11 is a perspective view of a link unit illustrated in FIG. 1.
Figure 12:
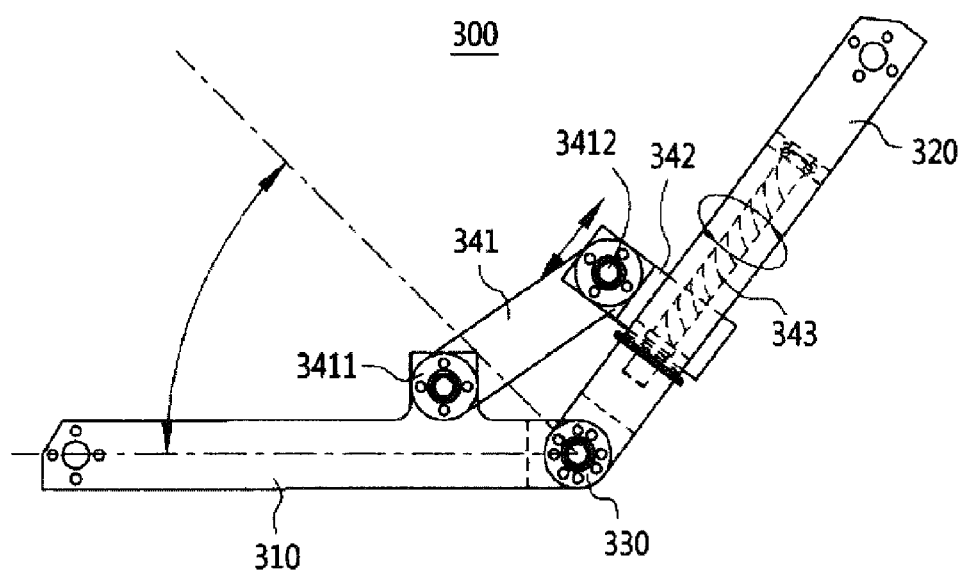
FIG. 12 is a front view of the link unit illustrated in FIG. 1.

FIG. 11 is a perspective view of the link unit 300 illustrated in FIG. 1, and FIG. 12 is a front view of the link unit 300 illustrated in FIG. 1.

Referring to FIGS. 11 and 12 along with FIG. 1, the link unit 300 may be configured to include the first links 310, the second links 320, and the link driving unit 340.

More specifically, the first links 310 may be fixed to the bottom of the first main body 110 of the first gripper unit 100 through first link fixing units 311. The second links 320 may be fixed to the bottom of the first main body 110 of the second gripper unit 200 through second link fixing units 321. Furthermore, the first links 310 and the second links 320 may be fixed by the main hinge units 330 in such a way as to rotate at a specific angle.

Furthermore, the link unit 300 may be configured to further include the link driving unit 340 capable of controlling the angle between the first link 310 and the second link 320.

Figure 13:
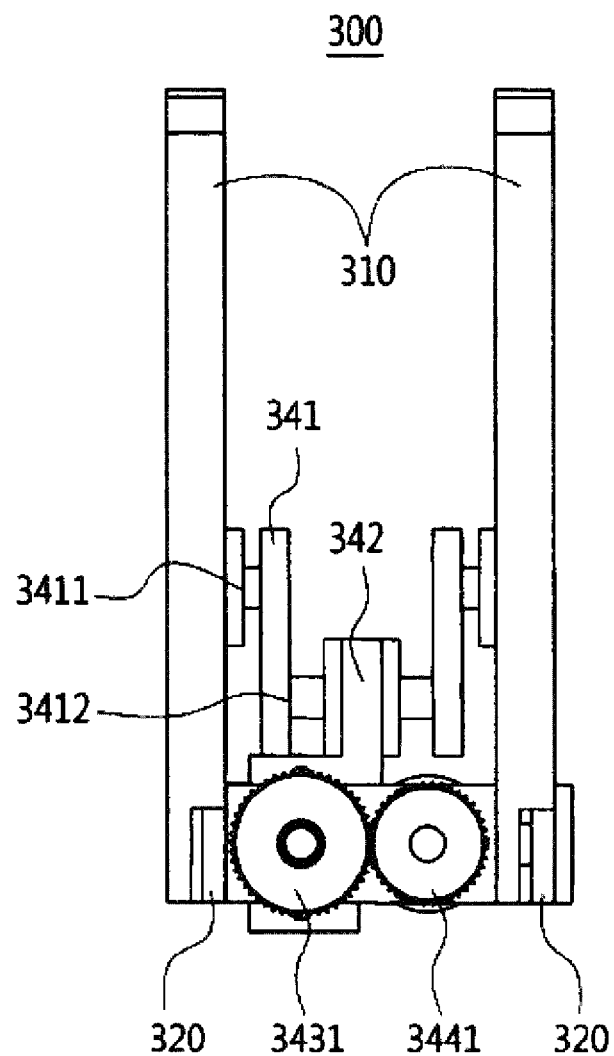
FIG. 13 is a side view of the link unit illustrated in FIG. 1.

More specifically, the link driving unit 340 may be configured to include a link driving motor 344, a screw 343, a slider 342, and rods 341. As illustrated in FIGS. 12 and 13, the slider 342 may be linearly moved by the rotation of the screw 343. Furthermore, the end of one side of each of the rods 341 may be fixed to the first link 310 by a first rod hinge 3411 in such a way as to rotate, and the end of the other end of the rod 341 may be fixed to the slider 342 by a second rod hinge 3412 in such a way as to rotate. Furthermore, a screw gear 3431 may be mounted on one end of the screw 343, and thus may be engaged with a driving motor gear 3441 mounted on the link driving motor 344. Accordingly, the link driving motor 344 may transfer driving force to the screw gear 3431 through the driving motor gear 3441, and the driving force transferred to the screw gear 3431 may rotate the screw 343. Furthermore, the slider 342 may be linearly moved by the rotation of the screw 343, and the rods 341 may be moved by the movement of the slider 342. As a result, the angle between the first link 310 and the second link 320 may be changed.

Figure 14:
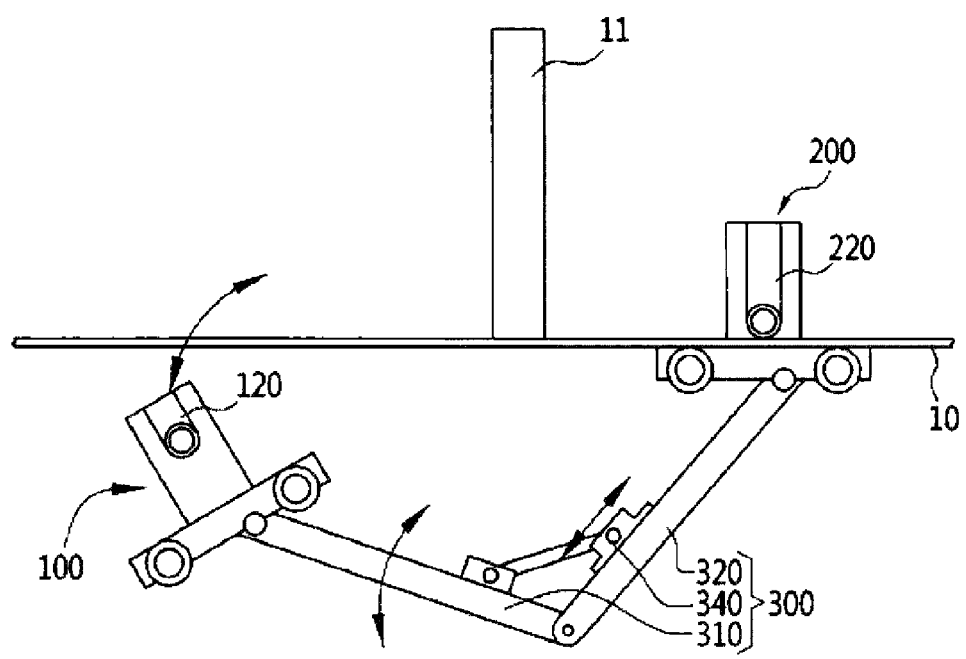
FIG. 14 is a side view illustrating an example which the mobile robot for a cable illustrated in FIG. 1 closely adheres to a cable and drives the link unit.

FIG. 14 is a side view illustrating an example which the mobile robot 400 for a cable illustrated in FIG. 1 closely adheres to the cable 10 and drives the link unit.

Referring to FIG. 14 along with FIG. 1, the second gripper unit 200 may be closely adhered to the cable 10 by the second driving wheel unit 220 and the second support wheel unit 230. Furthermore, the first gripper unit 100 may be separated from the cable 10 by changing the location of the first driving wheel unit 120.

The first gripper unit 100 separated from the cable 10 may move under the cable 10 by the link unit 300 whose angle has been changed.

As a result, as illustrated in FIG. 14, an obstacle 11 installed in the cable 10 can be overcome by specific driving of the first gripper unit 100, the second gripper unit 200, and the link unit 300.

A method of overcoming, by the mobile robot 400 for a cable, an obstacle is described in more detail below.

Figure 15:
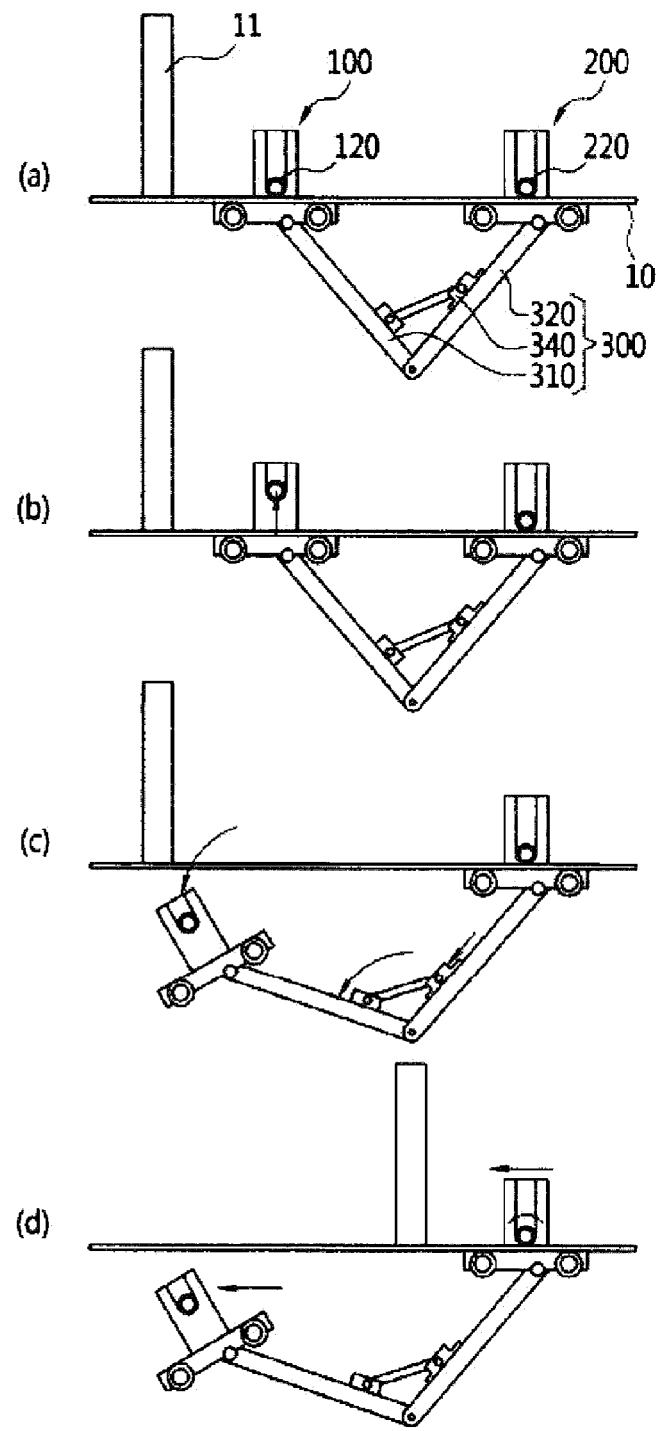
FIGS. 15 to 17 are side views illustrating an example in which the mobile robot for a cable illustrated in FIG. 1 moves along a cable.
Figure 16:
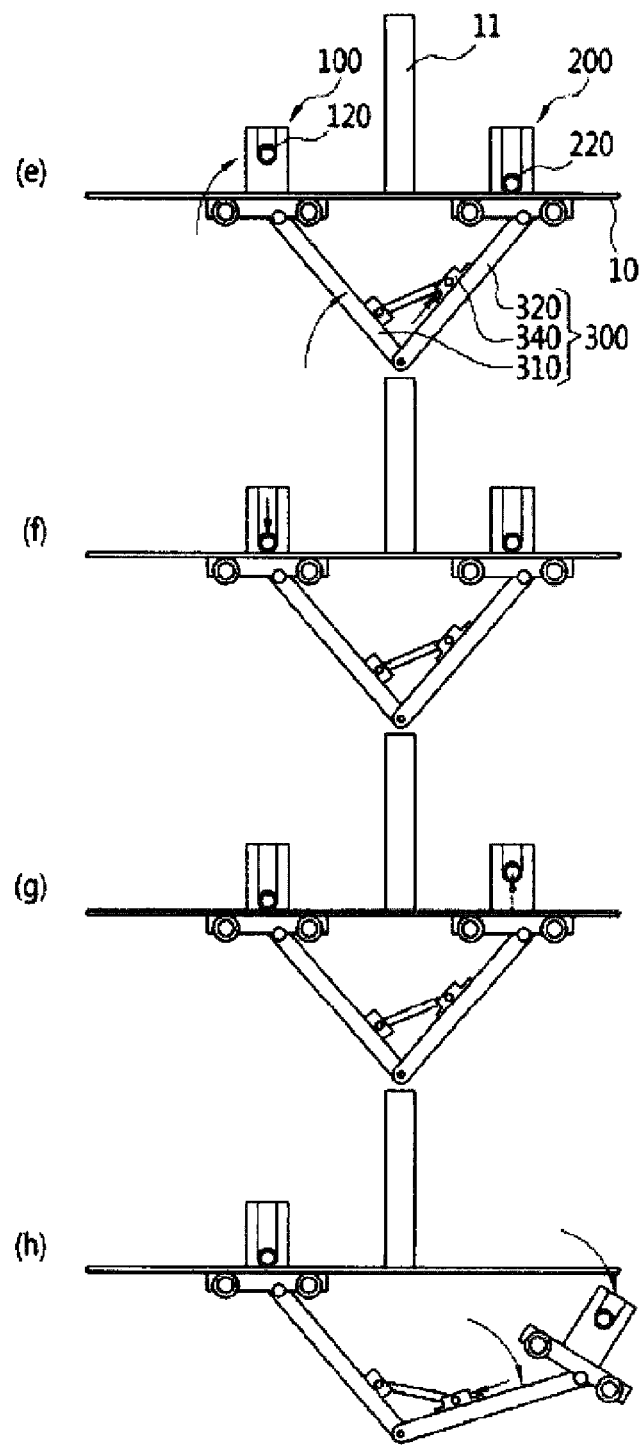
Figure 17:
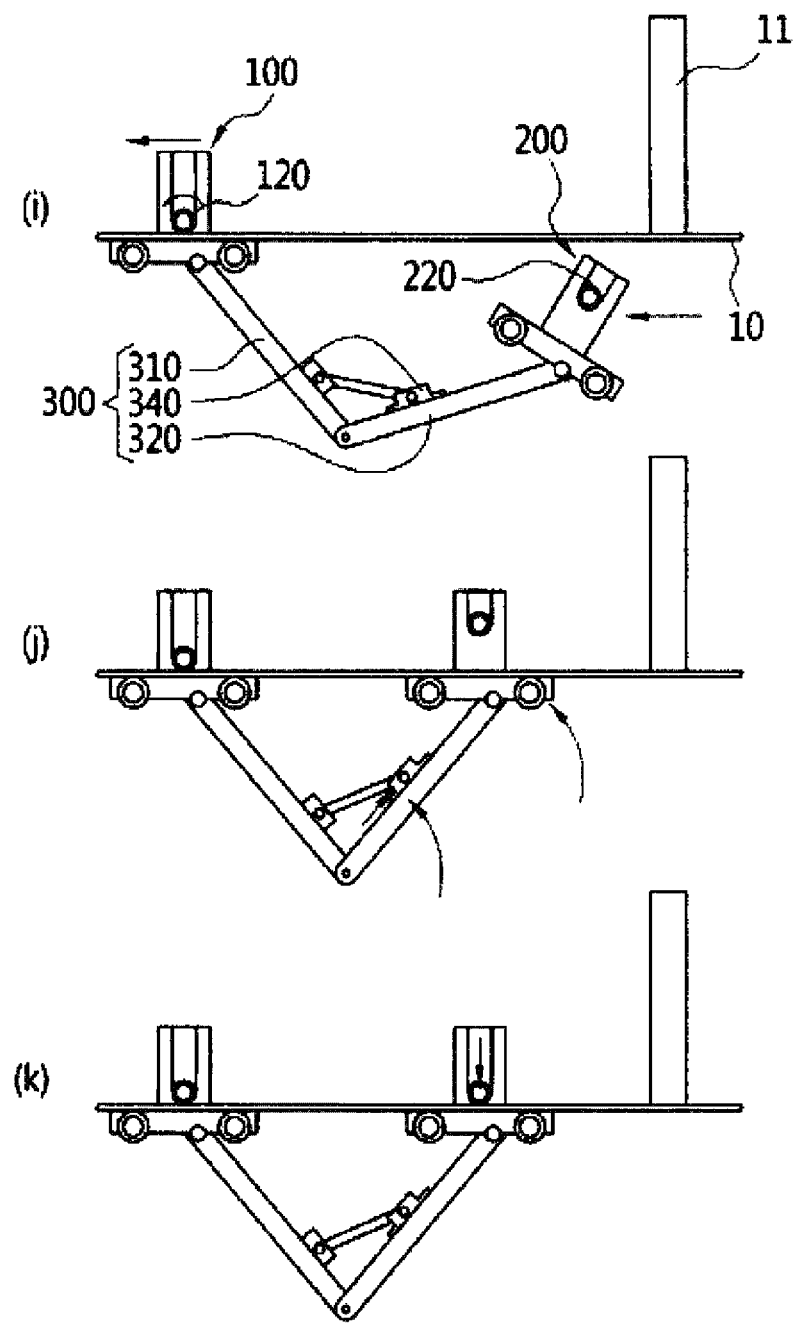
Figure 18:
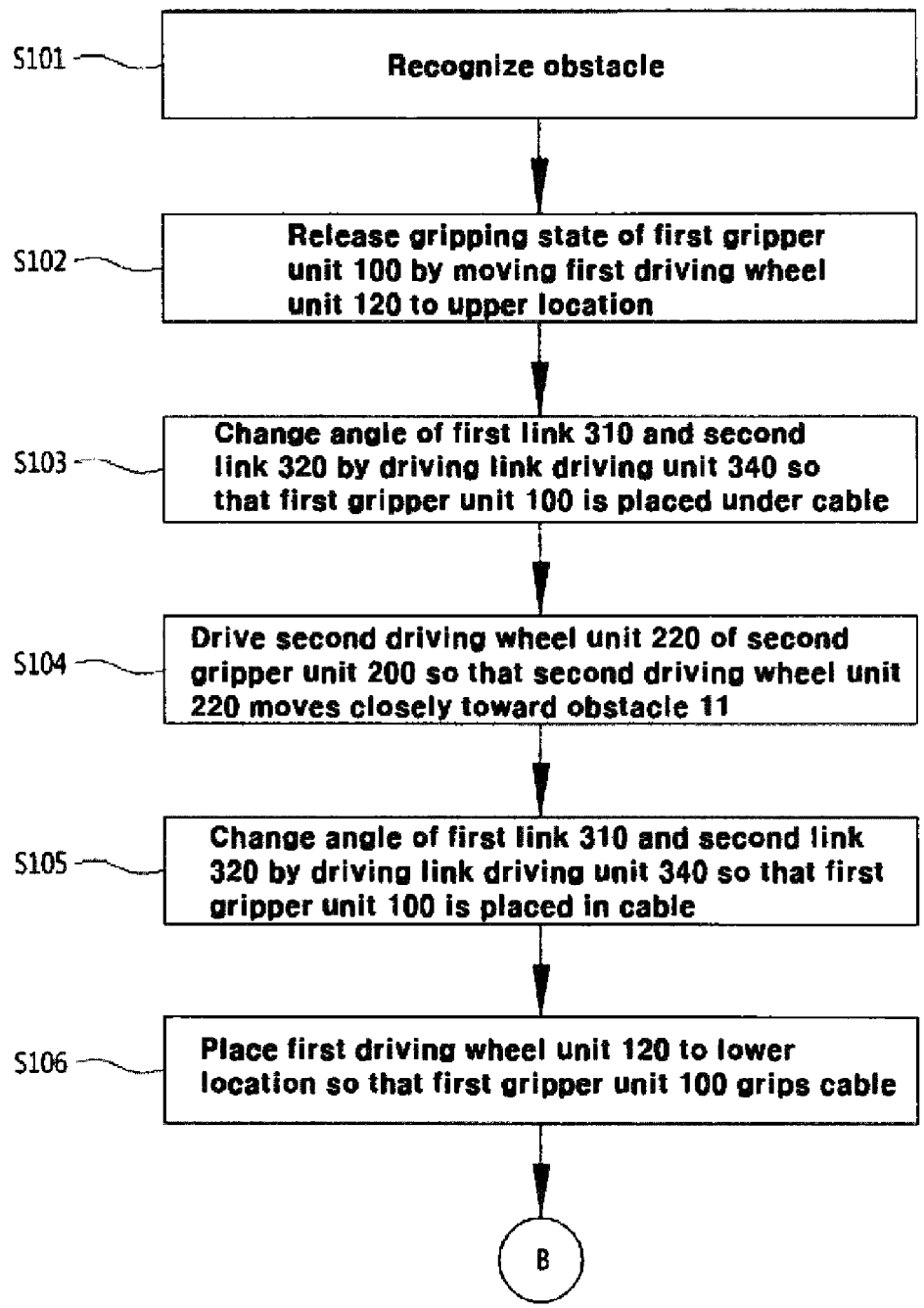
FIGS. 18 and 19 are flowcharts illustrating a method of overcoming, by the mobile robot for a cable illustrated in FIG. 1, an obstacle and moving on the cable.
Figure 19:
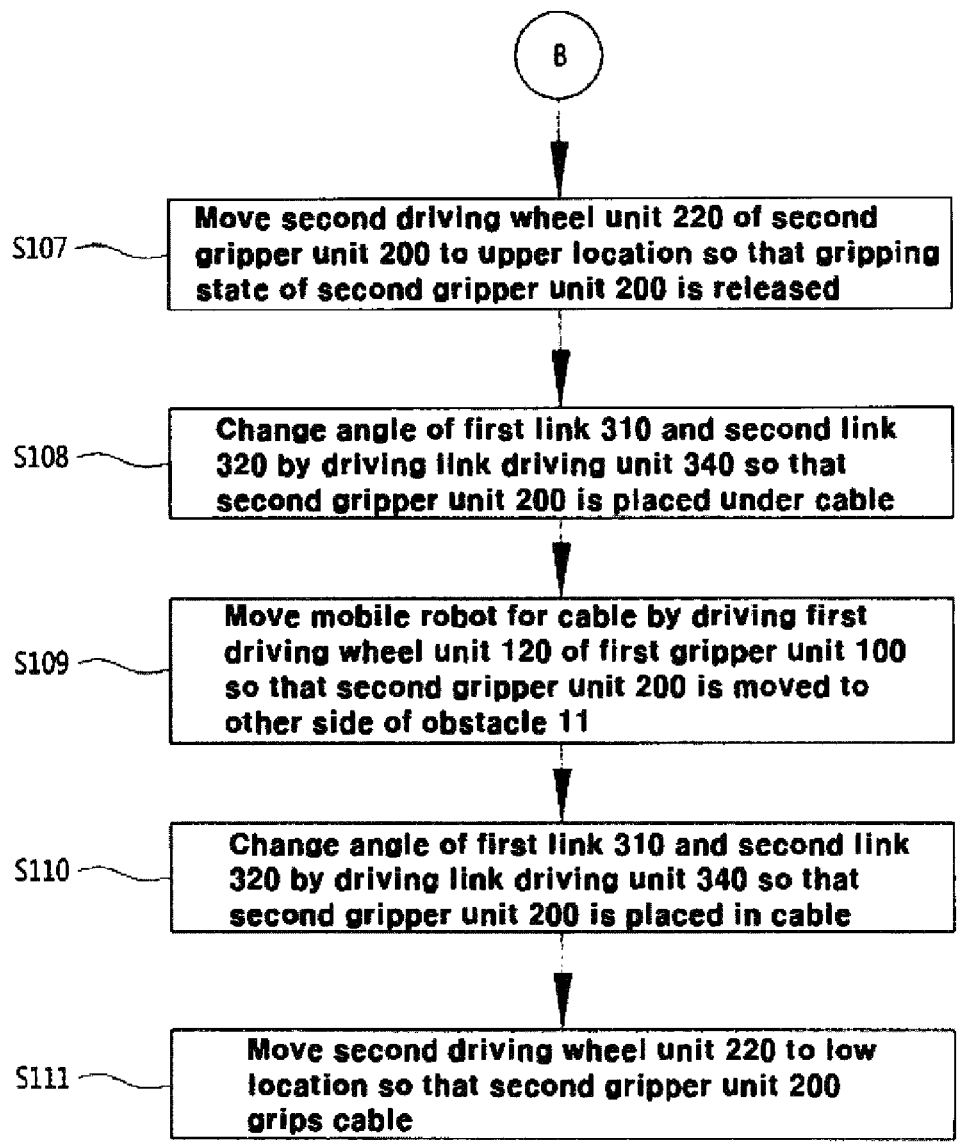

FIGS. 15 to 17 are side views illustrating an example in which the mobile robot for a cable illustrated in FIG. 1 moves along the cable, and FIGS. 18 and 19 are flowcharts illustrating a method of overcoming, by the mobile robot for a cable illustrated in FIG. 1, an obstacle and moving on the cable.

Referring to FIGS. 15 to 19 along with FIG. 1, the mobile robot 400 for a cable according to the present embodiment may overcome the obstacle 11 installed on the cable 10 (e.g. a spacer, a jumper, or a tensile clamp fixed to the cable) and move on the cable 10.

More specifically, as illustrated in FIGS. 15 to 17, the mobile robot 400 for a cable may overcome the obstacle 11 installed on the cable 10 through several steps. The method of overcoming, by the mobile robot 400 for a cable, the obstacle 11 and moving on the cable 10 may include (a) recognizing the obstacle 11 at step S101; (b) releasing the gripping state of the first gripper unit 100 by moving the first driving wheel unit 120 to an upper location at step S102; (c) changing the angle of the first link 310 and the second link 320 by driving the link driving unit 340 so that the first gripper unit 100 is placed under the cable 10 at step S103; (d) driving the second driving wheel unit 220 of the second gripper unit 200 so that the second driving wheel unit 220 moves closely toward the obstacle 11 at step S104; (e) changing the angle of the first link 310 and the second link 320 by driving the link driving unit 340 so that the first gripper unit 100 is placed in the cable 10 at step S105; (f) placing the first driving wheel unit 120 to a lower location so that the first gripper unit 100 grips the cable 10 at step S106; (g) moving the second driving wheel unit 220 of the second gripper unit 200 to an upper location so that the gripping state of the second gripper unit 200 is released at step S107; (h) changing the angle of the first link 310 and the second link 320 by driving the link driving unit 340 so that the second gripper unit 200 is placed under the cable 10 at step S108; (i) moving the mobile robot for a cable by driving the first driving wheel unit 120 of the first gripper unit 100 so that the second gripper unit 200 may be moved to the other side of the obstacle 11 at step S109; (j) changing the angle of the first link 310 and the second link 320 by driving the link driving unit 340 so that the second gripper unit 200 is placed in the cable 10 at step S110; and (k) moving the second driving wheel unit 220 to a low location so that the second gripper unit 200 grips the cable 10 at step S111.

Figure 20:
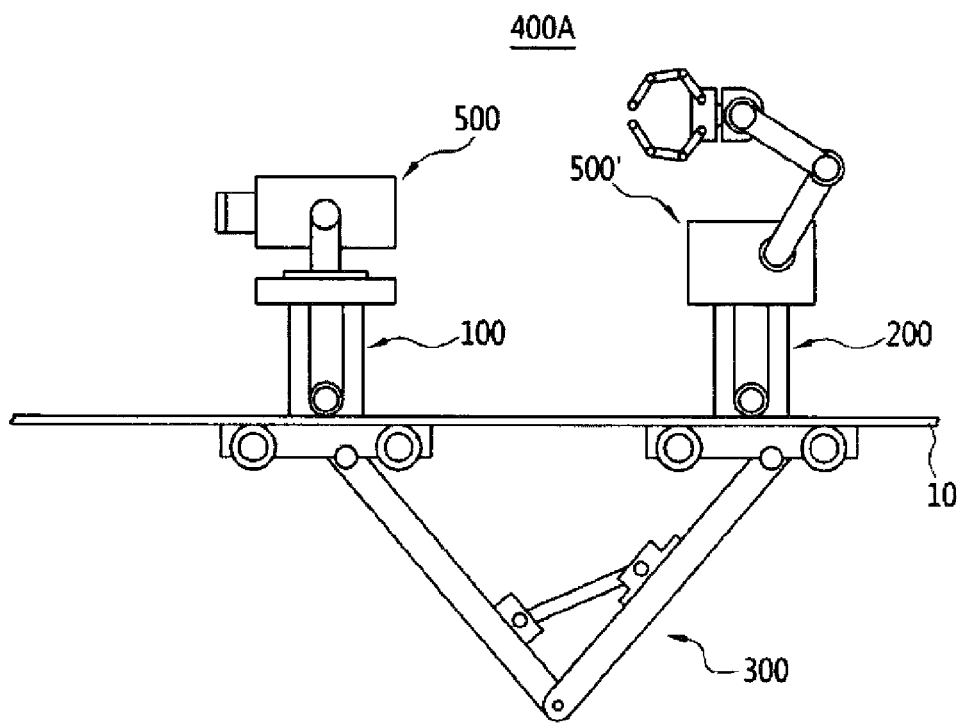
FIG. 20 is a side view of a mobile robot for a cable in accordance with yet another embodiment of the present invention.

FIG. 20 is a side view of a mobile robot for a cable in accordance with yet another embodiment of the present invention.

Referring to FIG. 20, an external mounting member, 500 and 500' may be further mounted on the first main body 110 or the second main body 210 of the mobile robot 400A for a cable in order to apply the mobile robot 400A for a cable to various fields.

The external mounting member 500, 500' is not specially limited to any member if the member may be mounted on the first main body 110 or the second main body 210 in order to achieve a specific purpose. For example, the member may be one or more selected from the group consisting of camera equipment, arms equipment, disaster relief equipment, weather observation equipment, heat detection equipment, cleaning equipment, and welding equipment.

Accordingly, equipment suitable for a specific object may be mounted on the mobile robot 400 for a cable including the first main body 110 and the second main body 210 and used.

As described above, the mobile robot for a cable according to the present invention includes the first gripper unit, the second gripper unit, and the link unit described above. Accordingly, the mobile robot can be driven according to a simple moving mechanism, can reduce its own weight, and can achieve improved mobility even in a cable on which various types of obstacle are installed.

Furthermore, the mobile robot for a cable according to the present invention can perform various tasks because an external mounting member can be mounted on the mobile robot.

What is claimed is:

1. A mobile robot capable of moving on a cable, comprising:
    a first gripper unit (100) configured to comprise a first main body (110), a first driving wheel unit (120) disposed over the first main body (110) and configured to have its wheels changed up and down, and a first support wheel unit (130) disposed under the first main body (110);
    a second gripper unit (200) configured to comprise a second main body (210), a second driving wheel unit (220) disposed over the second main body (210) and configured to have its wheels changed up and down, and a second support wheel unit (230) disposed under the second main body (210); and
    a link unit (300) configured to comprise first links (310) fixed to the first gripper unit (100), second links (320) fixed to the second gripper unit (200), and a link driving unit (340) configured to control an angle of the first links (310) and the second links (320), wherein the first links (310) and the second links (320) are fixed together by a main hinge unit (330) in such a way as to rotate at a specific angle,
    wherein the first driving wheel unit (120), together with the first support wheel unit (130), closely attaches the first gripper unit (100) to the cable or separates the first gripper unit (100) from the cable by gripping or releasing the cable through up and down movements,
    wherein the second driving wheel unit (220), together with the second support wheel unit (230), closely attaches the second gripper unit (200) to the cable or separates the second gripper unit (200) from the cable by gripping or releasing the cable through up and down movements, and
    wherein the link driving unit (340) comprises:
        a screw (343) mounted on the second links (320) and rotated by a link driving motor (344);
        a slider (342) mounted on the screw (343) and linearly moved by the rotation of the screw (343); and
        rods (341) configured to have first ends fixed to the first links (310) by first rod hinges (3411) in such a way as to rotate and to have second ends fixed to the slider (342) by second rod hinges (3412) in such a way as to rotate.

2. The mobile robot of claim 1, wherein the first driving wheel unit (120) and the second driving wheel unit (220) comprise:
    driving wheels (122, 222) configured to closely fit on a top of the cable and rotate on the cable;
    respective driving motors (123, 223) configured to transfer driving force to the driving wheels (122, 222); and
    respective location change units (121, 221) configured to comprise respective screws (1211, 2211), respective screw motors (1212, 2212), respective guide plates (1213, 2213), guide rollers (1214, 2214), and respective driving wheel supports (1215, 2215) so that up and down locations of the driving wheels (122, 222) are able to be controlled,
    wherein the driving wheel (122, 222) is mounted on a first end of the driving wheel support (1215, 2215), a second end of the driving wheel support (1215, 2215) is united with the screw (1211, 2211), and a guide roller (1214, 2214) that is restricted along the guide plate (1213, 2213) and moved is mounted between the first end and second end of the driving wheel support (1215, 2215), and
    when the screw motor (1212, 2212) is driven, the screw (1211, 2211) is rotated, and a location and angle of the driving wheel support (1215, 2215) is changed by the rotation of the screw (1211, 2211).

3. The mobile robot of claim 2, wherein a friction member (1221, 2221) made of elastic materials is mounted on an outer circumference surface of the driving wheel (122, 222) so that the friction member (1221, 2221) is firmly fit on the top of the cable and provides specific friction force.

4. The mobile robot of claim 1, wherein the first support wheel unit (130) and the second support wheel unit (230) comprise:
    respective pairs of support wheels (132, 232) configured to closely fit on a bottom of the cable and to be capable of rotating; and
    respective support frames (131, 231) mounted on one sides of the respective pairs of support wheels (132, 232) in such a way as to rotate.

5. The mobile robot of claim 4, wherein locations on sides of the pairs of support wheels (132, 232) are locations capable of forming equilateral triangle or isosceles triangle structures along with the locations of the driving wheels (122, 222).

6. The mobile robot of claim 4, wherein support wheel guides (1321, 2321) each having a circular shape on a side are mounted on both sides of each of the support wheels (132, 232) so that the support wheel guides are closely fit on the bottom and part of sides of the cable, wherein each of the support wheel guides has an external diameter (D2) that is 110 to 150% of an external diameter (D1) of the support wheel.

7. The mobile robot of claim 4, wherein the first support wheel unit (130) and the second support wheel unit (230) comprise:

respective auxiliary arms (133, 233) mounted on first ends of the respective support frames (131, 231) and extended in a specific length in a direction along which the mobile robot travels; and respective auxiliary wheels (134, 234) mounted on first ends of the respective auxiliary arms (133, 233) in such a way as to rotate and configured to closely fit on the bottom of the cable and rotate on the cable.

8. The mobile robot of claim 1, wherein, an external mounting member is mounted on the first main body (110) or the second main body (210).

9. The mobile robot of claim 8, wherein the external mounting member comprises one or more selected from a group consisting of camera equipment, cable repair equipment, arms equipment, disaster relief equipment, weather observation equipment, heat detection equipment, cleaning equipment, and welding equipment.

\* \* \* \* \*